United States Patent
Leyon et al.

(10) Patent No.: US 9,639,172 B2
(45) Date of Patent: May 2, 2017

(54) APPARATUS AND METHOD TO DYNAMICALLY VARY BACKLIGHTING FOR A PHYSICAL KEYBOARD

(71) Applicant: BlackBerry Limited, Waterloo (CA)

(72) Inventors: Christofer Bengt Thure Leyon, Malmo (SE); Maria Christina Nathalie Freyhult, Malmo (SE)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/523,184

(22) Filed: Oct. 24, 2014

(65) Prior Publication Data
US 2016/0116993 A1   Apr. 28, 2016

(51) Int. Cl.
*G06F 3/041*   (2006.01)
*G06F 3/023*   (2006.01)
(Continued)

(52) U.S. Cl.
CPC .......... *G06F 3/0233* (2013.01); *G06F 3/0202* (2013.01); *G06F 3/044* (2013.01);
(Continued)

(58) Field of Classification Search
CPC ........ G06F 1/1662; G06F 3/039; G06F 3/044; G06F 2203/04809; H03K 17/9622;
(Continued)

(56) References Cited

U.S. PATENT DOCUMENTS

| 8,754,854 B1 | 6/2014 | Hamburgen et al. |
| 2009/0128492 A1* | 5/2009 | Yoo ........................ G06F 3/0202 345/168 |

(Continued)

FOREIGN PATENT DOCUMENTS

WO   2013/050392 A1   4/2013

OTHER PUBLICATIONS

Extended European Search Report dated Mar. 22, 2016, received for Application No. 15190755.7.

*Primary Examiner* — Nelson Rosario
(74) *Attorney, Agent, or Firm* — Jon Gibbons; Fleit Gibbons Gutman; Bongini & Bianco P.L.

(57) ABSTRACT

An apparatus and method for dynamically varying backlighting for mechanical keys. By one approach at least some of the individual mechanical keys each includes a capacitively-sensitive keycap. A plurality of light emitters are disposed behind the physical keyboard and are configured to provide backlighting for the individual mechanical keys. A control circuit operably couples to the plurality of light emitters and controls the plurality of light emitters to selectively provide dynamically-varied backlighting for at least some of the individual mechanical keys. By one approach the dynamically-varied backlighting comprises, at least in part, instructions regarding available touch-based gestures (for example, gestures that the user can employ in conjunction with the capacitively-sensitive keycaps). Examples of touch-based gestures include, but are not limited to, swipe-based gestures and tap-based gestures. By one approach the aforementioned instructions include non-alphabetic visually-symbolic instructions.

18 Claims, 4 Drawing Sheets

(51) Int. Cl.

| | | |
|---|---|---|
| *G06F 3/0489* | (2013.01) | |
| *G06F 9/44* | (2006.01) | |
| *G06F 3/02* | (2006.01) | |
| *H01H 13/70* | (2006.01) | |
| *H01H 13/702* | (2006.01) | |
| *H01H 13/83* | (2006.01) | |
| *G06F 3/0488* | (2013.01) | |
| *G06F 3/044* | (2006.01) | |

(52) U.S. Cl.
CPC ...... *G06F 3/04883* (2013.01); *G06F 3/04895* (2013.01); *G06F 9/4446* (2013.01); *H01H 13/70* (2013.01); *H01H 13/702* (2013.01); *H01H 13/83* (2013.01); *H01H 2239/006* (2013.01)

(58) Field of Classification Search
CPC .......... H03K 2217/96031; H03K 2217/96054; H03K 2217/960755; H03K 2217/96079
USPC .................................................. 345/156–178
See application file for complete search history.

(56) References Cited

U.S. PATENT DOCUMENTS

| | | | |
|---|---|---|---|
| 2010/0302169 A1 | 12/2010 | Pance et al. | |
| 2011/0205161 A1* | 8/2011 | Myers ..................... | G06F 3/016 345/169 |
| 2011/0267285 A1* | 11/2011 | Cheng ................... | G06F 3/0421 345/173 |
| 2012/0228111 A1* | 9/2012 | Peterson ............. | H03K 17/962 200/600 |
| 2012/0266092 A1* | 10/2012 | Zhu ........................ | G06F 3/016 715/764 |
| 2014/0055363 A1* | 2/2014 | Meierling ............ | G06F 1/1662 345/169 |
| 2014/0266814 A1* | 9/2014 | Hu ........................ | G06F 3/0202 341/26 |

* cited by examiner

APPARATUS AND METHOD TO DYNAMICALLY VARY BACKLIGHTING FOR A PHYSICAL KEYBOARD

FIELD OF TECHNOLOGY

The present disclosure relates to electronic devices having physical keyboards with backlighting.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Many electronic devices include a physical keyboard having a plurality of individual mechanical keys. The mechanical keys of such a physical keyboard include one or more physically moving parts that comprise or otherwise interact with a mechanical switch. Pressing down on such a mechanical key serves to temporarily close its corresponding mechanical switch and hence signal to a corresponding control circuit the user's assertion of that particular key.

Backlighting a physical keyboard is also known in the art. Typically one or more light emitters (such as one or more light-emitting diodes) provide light that passes, at least to some extent, through one or more individual keys and/or around one or more keys to improve the user's ability to discern individual keys and/or the character or characters associated with such keys. In some cases the totality of the light provided in this way can be switched on or off to thereby provide backlighting for the entire keyboard or not as desired (thereby allowing the device to switch off backlighting in order to save power).

Some physical keyboards have one or more keycaps that comprise capacitively-sensitive keycaps. Such a keycap can detect user proximity and/or gentle user contact and can therefore provide the electronic device with another user-input modality to supplement physical actuation of the mechanical keys. While certainly useful, developments to date as regards the foregoing components do not fully satisfy all application settings. As one simple example in these regards, users can be (at least temporarily) unaware of the availability of input gestures that can be used at various times to input data or instructions via such capacitively-sensitive keycaps.

DETAILED DESCRIPTION

Figure 1:
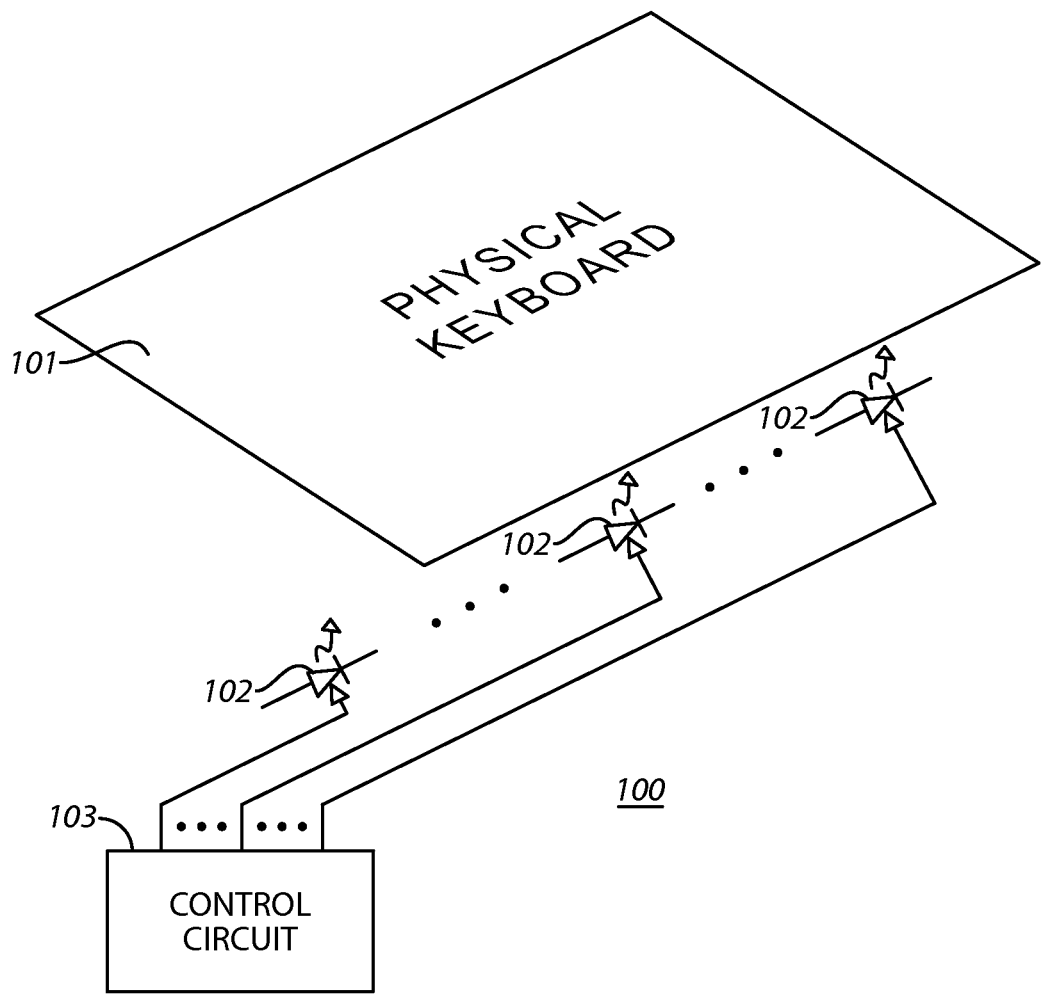
FIG. 1 is an exploded perspective block diagram in accordance with the disclosure.

The following describes an apparatus and method pertaining to an apparatus and method for dynamically varying backlighting for mechanical keys. By one approach at least some of the individual mechanical keys each include a capacitively-sensitive keycap. Pursuant to these teachings a plurality of light emitters are disposed behind the physical keyboard and are configured to provide backlighting for the individual mechanical keys. A control circuit operably couples to the plurality of light emitters and controls the plurality of light emitters to selectively provide dynamically-varied backlighting for at least some of the individual mechanical keys.

By one approach the dynamically-varied backlighting comprises, at least in part, instructions regarding available touch-based gestures (for example, gestures that the user can employ in conjunction with the capacitively-sensitive keycaps). Examples of touch-based gestures include, but are not limited to, swipe-based gestures and tap-based gestures. By one approach the aforementioned instructions include non-alphabetic visually-symbolic instructions.

By one approach the aforementioned dynamically-varied backlighting comprises selectively switching particular ones of the plurality of light emitters on and off. This can include, for example, switching all of the plurality of light emitters on and off in synchronism with one another, switching a lesser number of all of the available plurality of light emitters on and off, and sequentially switching two or more of the light emitters on and off to effect a kind of animation.

So configured, various dynamic alterations to the keyboard backlighting can serve to symbolically suggest one or more available gestures that the user can employ with the capacitively-sensitive keycaps. Blinking lights, for example, can suggest tapping or double tapping gestures. A string of sequentially illuminated light emitters, on the other hand, can suggest swiping-based gestures.

By dynamically varying keyboard backlighting to provide instructional hints in these regards, these teachings can greatly facilitate the user's successful awareness and employment of a variety of gestures notwithstanding a relative lack of training or prior experience on the part of the user.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents an illustrative example in these regards. In this example the enabling apparatus comprises a portable electronic device 100. This portable electronic device 100 includes at least one physical keyboard 101. By one approach this physical keyboard 101 comprises an alpha-numeric keyboard having a particular desired layout (such as the well-known QWERTY keyboard layout or the lesser known DVORAK keyboard layout).

Figure 2:
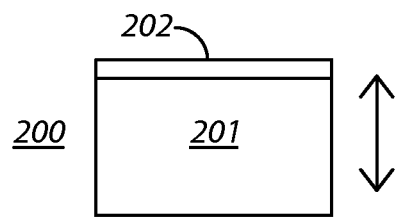
FIG. 2 is a front elevational block diagram in accordance with the disclosure.

This physical keyboard 101 includes a plurality of individual mechanical keys. FIG. 2 generally illustrates a mechanical key 200 having at least one part 201 thereof that comprises a physically moving part that interacts with a mechanical switch such as the well-known dome switch (not shown). In this illustrative example the vertical arrow represents that ability to physically move. Numerous approaches to configuring mechanical keys are known in the art. As the present teachings are not particularly sensitive to any particular selections in these regards, further elaboration here regarding mechanical keys is not provided for the sake of brevity.

FIG. 2 also illustrates the key 200 as including a capacitively-sensitive keycap 202. So configured, this key 200 can respond to some appropriate amount of pressure as exerted by a user's finger (not shown) by activation of a mechanical switch and can also respond to mere, slight contact with the user's finger on the capacitively-sensitive keycap 202 to thereby detect the presence of the user's finger on the key 200. Capacitively-sensitive keycaps are also generally well known in the art and hence require no further elaboration here.

Referring again to FIG. 1, this portable electronic device 100 also includes a plurality of light emitters 102. These light emitters are disposed behind the aforementioned physical keyboard 101 and are configured to provide backlighting for the individual mechanical keys 200.

By one approach these light emitters 102 comprise, at least in part, light-emitting diodes. By one approach these light-emitting diodes are physically positioned behind the physical keyboard 101. By another approach, the light-emitting diodes may be positioned below and to the side of the physical keyboard 101 with their resultant light being translated via one or more light pipes or the like behind the physical keyboard 101 to provide the desired keyboard backlighting.

There can be as few or as many discrete light emitters 102 as desired to suit the needs of a given application setting. For many purposes, as few as three light emitters 102 (or perhaps even only two light emitters 102) will suffice. For other application settings it may be useful to provide a discrete light emitter 102 on a one-to-one basis for each of the mechanical keys 200. By one approach, and as suggested by FIG. 1, it can be useful to align the plurality of light emitters 102 in a co-linear manner. In other cases it may be useful to orient the light emitters 102 in other ways and according to other layout constellations.

By one approach these light emitters 102 may all emit the same color of light (such as a white-colored light). By another approach some of these light emitters 102 may emit different colors of light as compared to one another if desired. By yet another approach each light emitter 102 may be capable of emitting more than one color of light on a selective basis.

A control circuit 103 operably couples to the aforementioned plurality of light emitters 102. Such a control circuit 103 can comprise a fixed-purpose hard-wired platform or can comprise a partially or wholly programmable platform. These architectural options are well known and understood in the art and require no further description here. This control circuit 103 is configured (for example, by using corresponding programming as will be well understood by those skilled in the art) to carry out one or more of the steps, actions, and/or functions described herein.

In particular, by one approach the control circuit 103 is configured (for example, via corresponding programming) to control the plurality of light emitters 102 to selectively provide dynamically-varied backlighting for at least some of the individual mechanical keys 200. This dynamically-varied backlighting can itself comprise, at least in part, instructions regarding available touch-based gestures (that is, gestures that the user can employ via selective interaction with the aforementioned capacitively-sensitive keycaps 202).

These touch-based gestures can include, but are not limited to, swipe-based gestures as well as tap-based gestures. Generally speaking, a swipe is a touch that begins at one location (i.e., one of the keys 200) and ends at another location (i.e., another of the keys 200) (as when the user places their fingertip on the physical keyboard 101 and consecutively drags their fingertip along the surfaces of a series of adjacent capacitively-sensitive keycaps 202 of the physical keyboard 101).

As will be shown below in more detail, these instructions regarding available touch-based gestures can themselves comprise non-alphabetic visually-symbolic instructions.

Figure 3:
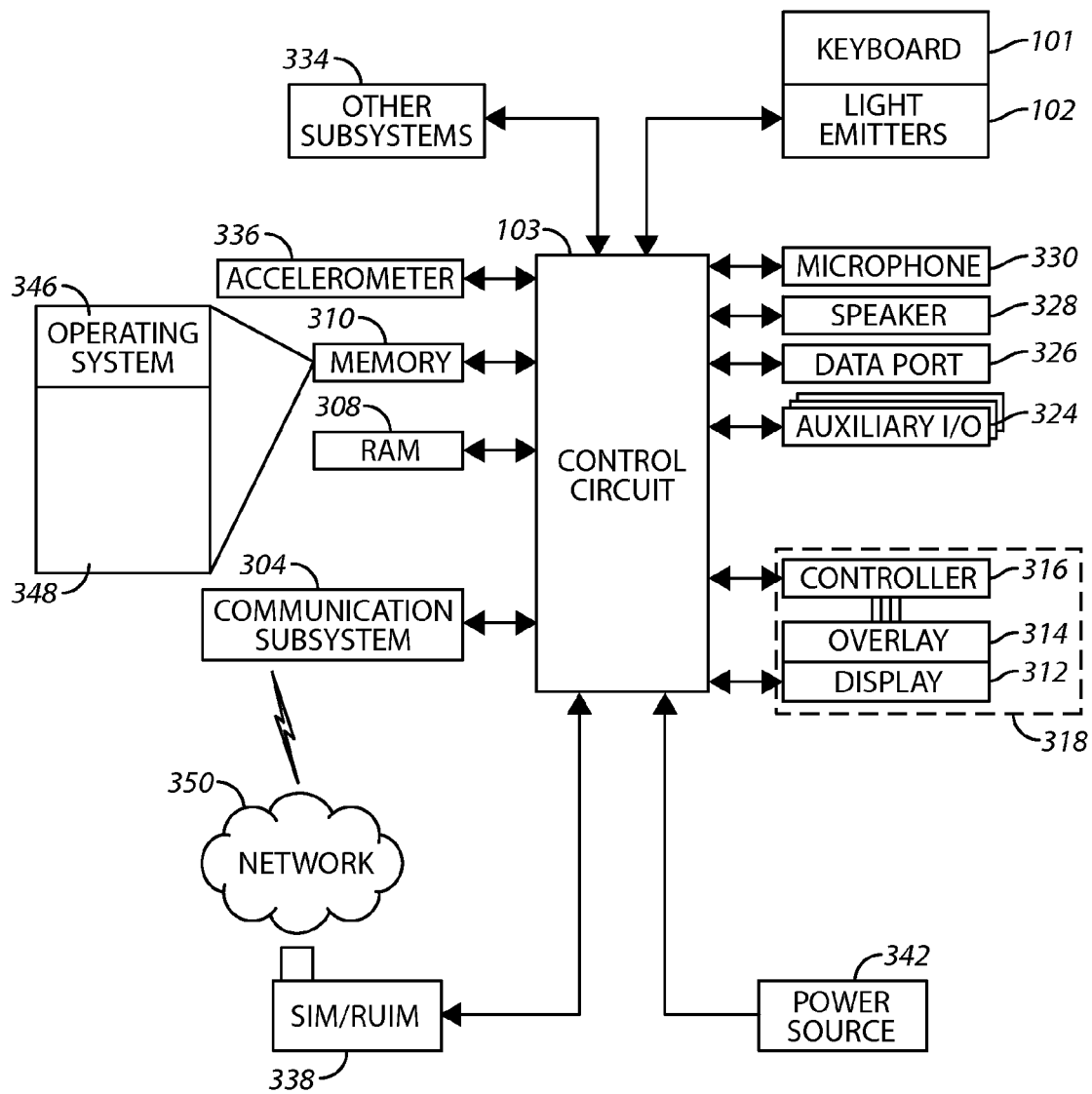
FIG. 3 is a block diagram in accordance with the disclosure.

FIG. 3 presents an illustrative example where the portable electronic device 100 comprises, for example, a portable communications device such as a modern cellular telephone or a tablet/pad-styled apparatus as are known in the art.

In this illustrative example communication functions, including data and voice communications, are performed through a communication subsystem 304 that operably couples to the aforementioned control circuit 103. The communication subsystem 304 receives messages from and sends messages to a wireless network 350. The wireless network 350 may be any type of wireless network, including, but not limited to, a wireless data network, a wireless voice network, or a network that supports both voice and data communications. The control circuit 103 may also operably couple to other subsystems 334 such as, for example, a short-range communication subsystem (such as an 802.11 or 802.16-compatible transceiver and/or a Bluetooth™-compatible transceiver).

To identify a subscriber for network access, the portable electronic device 100 may utilize a Subscriber Identity Module or a Removable User Identity Module (SIM/RUIM) card 338 for communication with a corresponding network, such as the wireless network 350. Alternatively, user identification information may be programmed into a memory 310 that also operably couples to the control circuit 103.

A power source 342, such as one or more rechargeable batteries or a port to an external power supply, powers the portable electronic device 100. The control circuit 103 may interact with an accelerometer 336 that may be utilized to detect direction of gravitational forces or gravity-induced reaction forces. The control circuit 103 also interacts with a variety of other components, such as a Random Access Memory (RAM) 308, the aforementioned memory 310, an auxiliary input/output (I/O) subsystem 324, a data port 326, a speaker 328, and a microphone 330.

If desired, and in addition to the aforementioned physical keyboard 101, a display 312 can be disposed in conjunction with a touch-sensitive overlay 314 that operably couples to an electronic controller 316. Together these components can comprise a touch-sensitive display 318 that serves as a graphical-user interface. Information such as text, characters, symbols, images, icons, and other items may be displayed on the touch-sensitive display 318 via the control circuit 103.

The portable electronic device 100 in this example also includes an operating system 346 and software programs, applications, or components 348 of choice that are executed by the control circuit 103 and that are typically stored in a persistent, updatable store such as the memory 310. Additional applications or programs may be loaded onto the portable electronic device through the wireless network 350, the auxiliary I/O subsystem 324, the data port 326, a short-range communications subsystem, or any other suitable subsystem 334. The memory 310 may comprise a non-transitory storage media that stores executable instructions which, when executed, causes one or more of the functions, steps, or actions described herein.

As a communication device, a received signal such as a text message, an e-mail message, or web page download is processed by the communication subsystem and input to the control circuit 103. The control circuit 103 processes the received signal for output to the display 312 and/or to the auxiliary I/O subsystem 324. A user may generate data items, for example e-mail messages, that may be transmitted over the wireless network 350 through the communication subsystem. For voice communications, the overall operation of the portable electronic device is similar. The speaker 328 outputs audible information converted from electrical signals, and the microphone 330 converts audible information into electrical signals for processing.

As noted above, such an apparatus can control the plurality of light emitters 102 to selectively provide dynamically-varied backlighting for at least some of the individual mechanical keys 200. In particular, this dynamically-varied backlighting can comprise non-alphabetic visually-symbolic instructions regarding touch-based gestures that are presently available via the capacitively-sensitive keycaps 202. FIGS. 4 through 7 present some illustrative examples in these regards. For the sake of clarity and simplicity, these examples presume the availability of three light emitters 102 denoted in the illustrations as light emitter 1, light emitter 2, and light emitter 3. It shall be understood that no particular limitations are intended by the specifics of these examples. In fact, a considerably greater number of light emitters may be similarly utilized in a given application setting.

Figure 4:
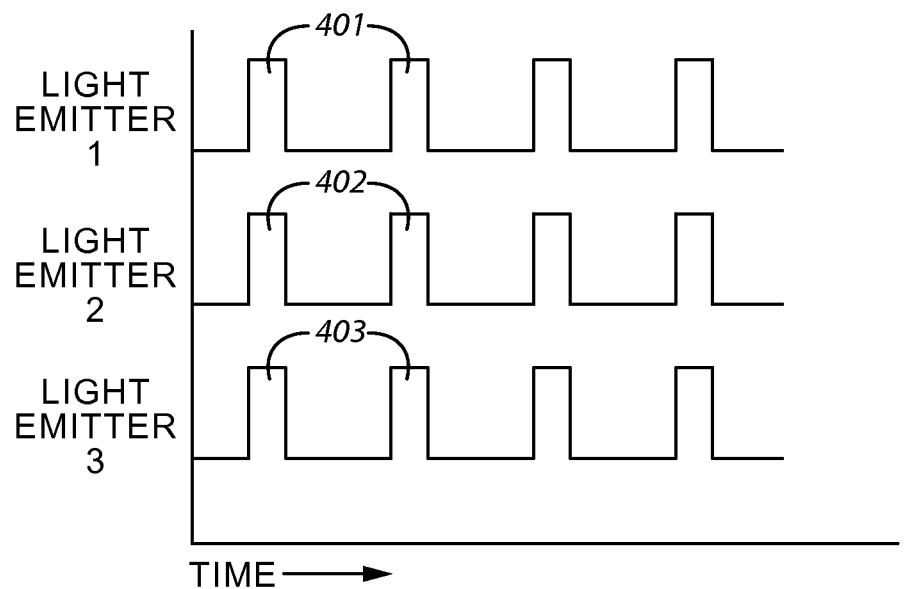
FIG. 4 is a timing diagram in accordance with the disclosure.

FIG. 4 illustrates how the light emitters 102 can serve to instruct the user regarding present availability of a tap-based gesture (and in particular a single-tap gesture). In this example, and upon determining present availability of a single-tap gesture should the user wish to make such a gesture, the control circuit 103 causes each of the light emitters 102 to be momentarily lit in synchronism with one another. In particular, light emitter 1 is periodically caused to emit a series of evenly-spaced light pulses 401 in synchronism with a similar series of evenly-spaced light pulses 402 and 403 from light emitter 2 and light emitter 3, respectively. So configured, the entire backlighting of the physical keyboard 101 will flash on and off to signal the availability of such a gesture.

Figure 5:
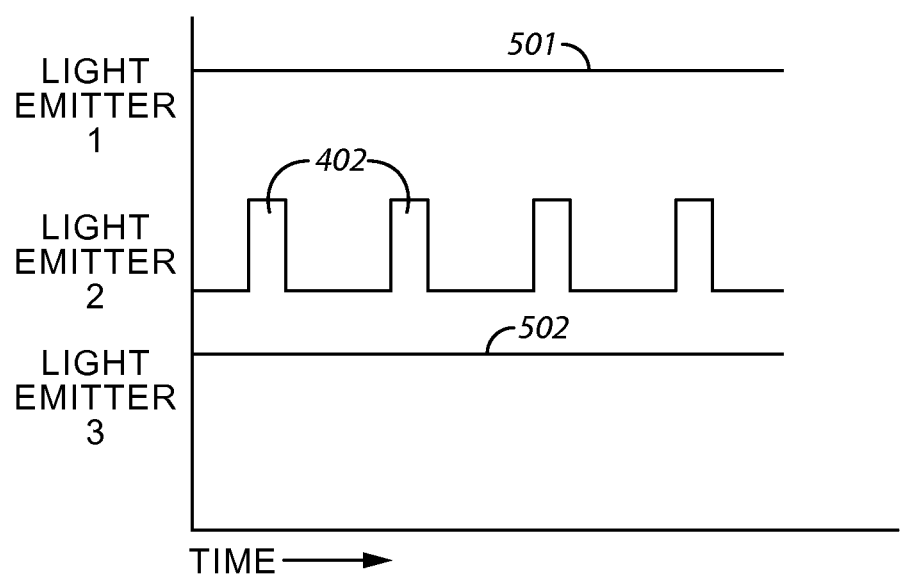
FIG. 5 is a timing diagram in accordance with the disclosure.

FIG. 5 can similarly signal the availability of a single gesture, but in this example only light emitter 2 issues the series of evenly-spaced light pulses 402 while light emitter 1 remains constantly lit 501 and light emitter 3 remains constantly lit 502. By one approach, the flashing light emitter 102 can correspond (at least more or less) to a present location of the users finger(s) on a given capacitively-sensitive keycap 202.

Figure 6:
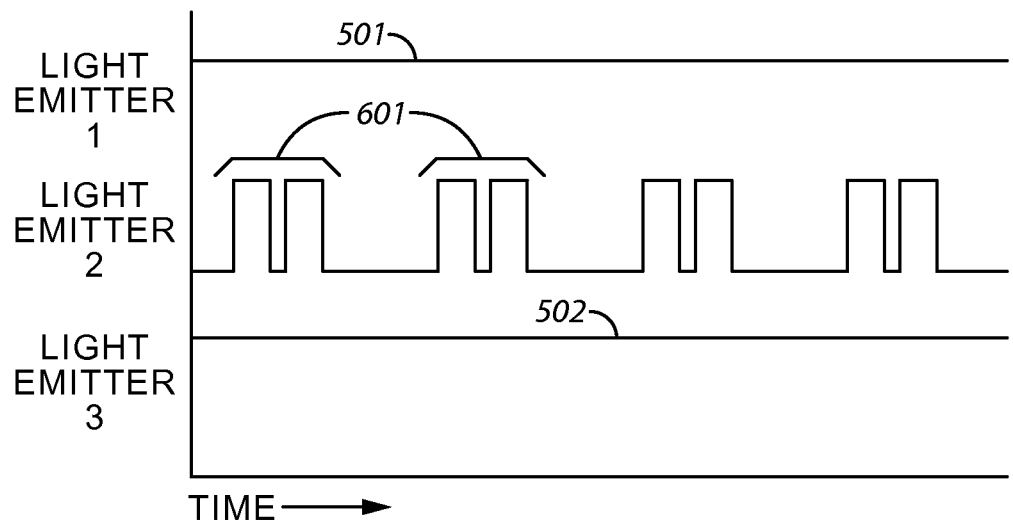
FIG. 6 is a timing diagram in accordance with the disclosure.

FIG. 6 presents an example of dynamically-varied backlighting that can signal present availability of a double-tap gesture. In this example the light emitter 2 issues a series of twin flashes 601 of light while the other two light emitters remain constantly lit 501 and 502 respectively. As suggested by the illustration, the flashes that comprise each pair of flashes 601 are temporally close to one another (separated, for example, by only a small amount of time such as 10 ms, 20 ms, 50 ms, or the like) while the temporal distance between each pair of flashes 601 is significantly greater (such as 100 ms, 300 ms, or the like).

Figure 7:
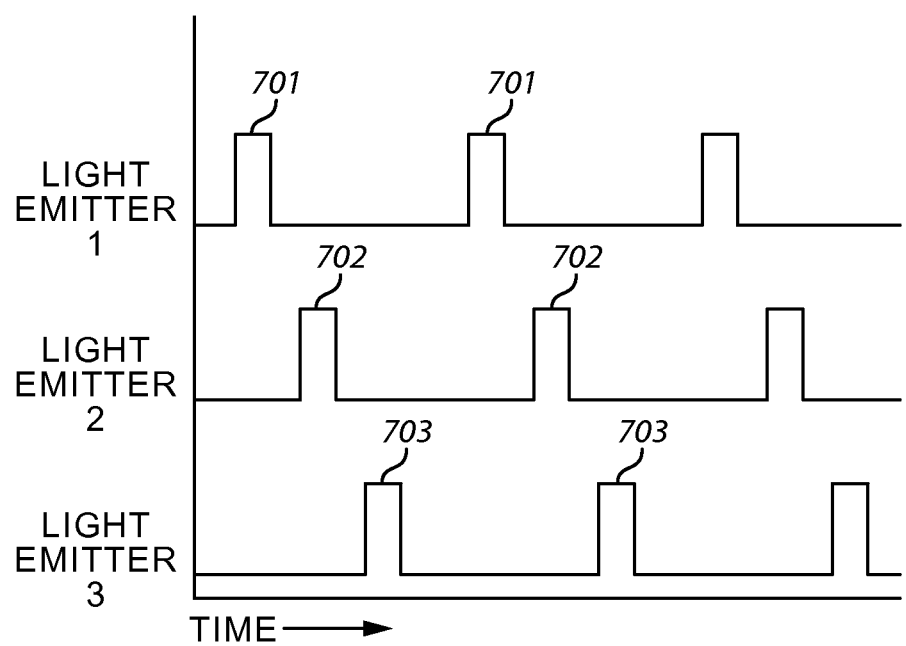
FIG. 7 is a timing diagram in accordance with the disclosure.

FIG. 7 presents an example where the dynamically-varied backlighting signals present availability of a swipe-based gesture. In this example the three light emitters 102 again flash in synchronism with one another but in this case the flashes are temporally spaced apart from one another. More specifically, light emitter 1 provides a first momentary flash of light 701 followed some time later (such as 10 ms, 50 ms, 100 ms, or the like) by light emitter 2 providing a momentary flash of light 702, which is then followed some similar amount of time later by light emitter 3 providing a momentary flash of light 703. This sequence of light flashes can then be repeated as desired. So configured, the flashes of light suggest, via a kind of animation, that the user can effect a swipe-based gesture across multiple capacitively-sensitive keycaps 202.

These teachings are in fact highly flexible in practice and will accommodate a wide variety of dynamic variations to thereby suggest any of a variety of corresponding interactions with the capacitively-sensitive keycaps 202. These teachings are also readily employed in conjunction with many existing backlighting designs and hence can be economically deployed and utilized.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method by a control circuit operably coupled to a plurality of light emitters disposed behind a physical keyboard that includes a plurality of mechanical keys with a discrete light emitter disposed behind each of the mechanical keys, each discrete light emitter configured to provide backlighting for only the mechanical key behind which it is disposed, at least some of the mechanical keys each includes a capacitively-sensitive keycap, the method comprising:
controlling the plurality of light emitters to selectively provide dynamically-varied flashing backlighting for at least some of the individual mechanical keys in response to the capacitively-sensitive keycap of the at least some of the mechanical keys being contacted,
wherein the control circuit causes the backlighting for at least three mechanical keys of the plurality of mechanical keys to flash sequentially, wherein the flash of a second mechanical key occurs a given amount of time after the flash of a first mechanical key, and wherein the flash of a third mechanical key occurs the given amount of time after the flash of the second mechanical key.

2. The method of claim 1 wherein the dynamically-varied backlighting comprises, at least in part, instructions regarding available touch-based gestures.

3. The method of claim 2 wherein the available touch-based gestures include at least a swipe-based gesture and a tap-based gesture.

4. The apparatus of claim 2 wherein the instructions regarding available touch-based gestures include non-alphabetic visually-symbolic instructions.

5. The method of claim 1, wherein the control circuit causes the backlighting for every mechanical key of the plurality of mechanical keys to flash on and off in synchronization.

6. The method of claim 1, wherein the control circuit causes flashing of the backlighting for at least one mechanical key based on a present location of a user's finger relative to a capacitively-sensitive keycap of the at least one mechanical key.

7. An apparatus comprising
   a physical keyboard including a plurality of mechanical keys, wherein at least some of the mechanical keys each includes a capacitively-sensitive keycap;
   a plurality of light emitters disposed behind the physical keyboard and configured to provide backlighting for the mechanical keys; and
   a control circuit operably coupled to the plurality of light emitters and configured to control the plurality of light emitters to selectively provide dynamically-varied flashing backlighting for at least some of the mechanical keys,
   wherein the control circuit causes backlighting at only one mechanical key of the plurality of mechanical keys and causes no backlighting at all other mechanical keys of the plurality of mechanical keys, wherein the backlighting at only one mechanical key consists of a series of pairs of flashes, wherein the flashes of each pair occur at a first temporal distance from one another and wherein each pair occurs at a second temporal distance from one another, the second temporal distance being significantly greater than the first temporal distance.

8. The apparatus of claim 7 wherein the physical keyboard comprises an alphanumeric keyboard.

9. The apparatus of claim 7 wherein the apparatus comprises a portable electronic device.

10. The apparatus of claim 7 wherein the plurality of light emitters comprises, at least in part, a plurality of light-emitting diodes.

11. The apparatus of claim 7 wherein the dynamically-varied backlighting comprises, at least in part, instructions regarding available touch-based gestures.

12. The apparatus of claim 11 wherein the available touch-based gestures include at least a swipe-based gesture and a tap-based gesture.

13. The apparatus of claim 11 wherein the instructions regarding available touch-based gestures include non-alphabetic visually-symbolic instructions.

14. The apparatus of claim 7, including one light emitter corresponding to each mechanical key of the plurality of mechanical keys, and in which the control circuit causes each light emitter to be momentarily lit in synchronism with one another.

15. An apparatus comprising,
   a physical keyboard including a plurality of mechanical keys, wherein at least some of the mechanical keys each includes a capacitively-sensitive keycap;
   a plurality of light emitters disposed behind the physical keyboard and configured to provide backlighting for the mechanical keys; and
   a control circuit operably coupled to the plurality of light emitters and configured to control the plurality of light emitters to selectively flash lighting for at least some of the mechanical keys to thereby present a symbolic representation of a touch-based gesture,
   wherein the control circuit causes the backlighting for at least three mechanical keys of the plurality of mechanical keys to flash sequentially, wherein the flash of a second mechanical key occurs a given amount of time after the flash of a first mechanical key, and wherein the flash of a third mechanical key occurs the given amount of time after the flash of the second mechanical key.

16. The apparatus of claim 15 wherein the plurality of light emitters comprises, at least in part, a plurality of light-emitting diodes.

17. The apparatus of claim 15 wherein the control circuit is configured to control the plurality of light emitters to selectively flash lighting for at least some of the mechanical keys to thereby present a selected one of a plurality of symbolic representations of a plurality of available touch-based gestures.

18. The apparatus of claim 17 wherein the control circuit is configured to selectively flash lighting for at least some of the mechanical keys by selectively switching particular ones of the plurality of light emitters on and off.

* * * * *